(No Model.) 2 Sheets—Sheet 2.

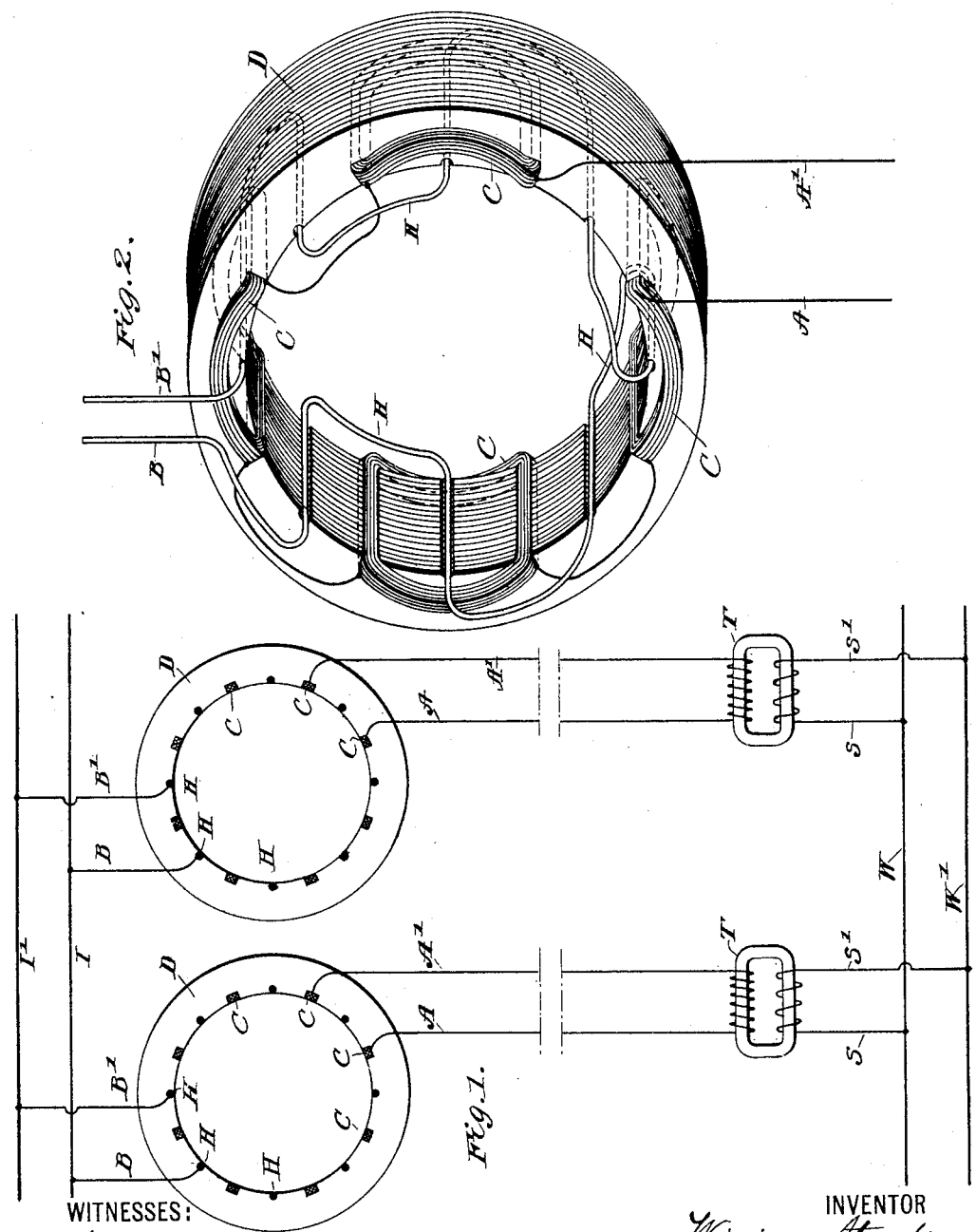

W. STANLEY.
SYSTEM FOR AND METHOD OF ELECTRICAL DISTRIBUTION OF ENERGY.

No. 533,323. Patented Jan. 29, 1895.

WITNESSES:
Frank S. Ober.
J. R. Stagg

INVENTOR
William Stanley
BY
H. B. Brownell
his ATTORNEY

UNITED STATES PATENT OFFICE.

WILLIAM STANLEY, OF PITTSFIELD, MASSACHUSETTS, ASSIGNOR TO THE STANLEY LABORATORY COMPANY, OF SAME PLACE.

SYSTEM FOR AND METHOD OF ELECTRICAL DISTRIBUTION OF ENERGY.

SPECIFICATION forming part of Letters Patent No. 533,323, dated January 29, 1895.

Application filed November 3, 1894. Serial No. 527,830. (No model.)

*To all whom it may concern:*

Be it known that I, WILLIAM STANLEY, of the city of Pittsfield, county of Berkshire, and State of Massachusetts, have invented certain new and useful Improvements in Systems for and Methods of Electrical Distribution of Energy, of which the following is a specification.

My invention relates to the distribution of the electrical energy of two or more alternating dynamos or alternators, and has for its object to keep the alternators in phase, or at a definite difference of phase, also to prevent any one alternator from racing in case it becomes unloaded, and also to prevent the short circuiting of more than one alternator by reason of a defect arising in a main and to prevent leakage of current from the mains of one alternator to the mains of another. I attain these objects by the means hereinafter described and shown in the accompanying drawings. In connection with the description of the means, I will also describe the method by which the results are accomplished.

Figure 4:
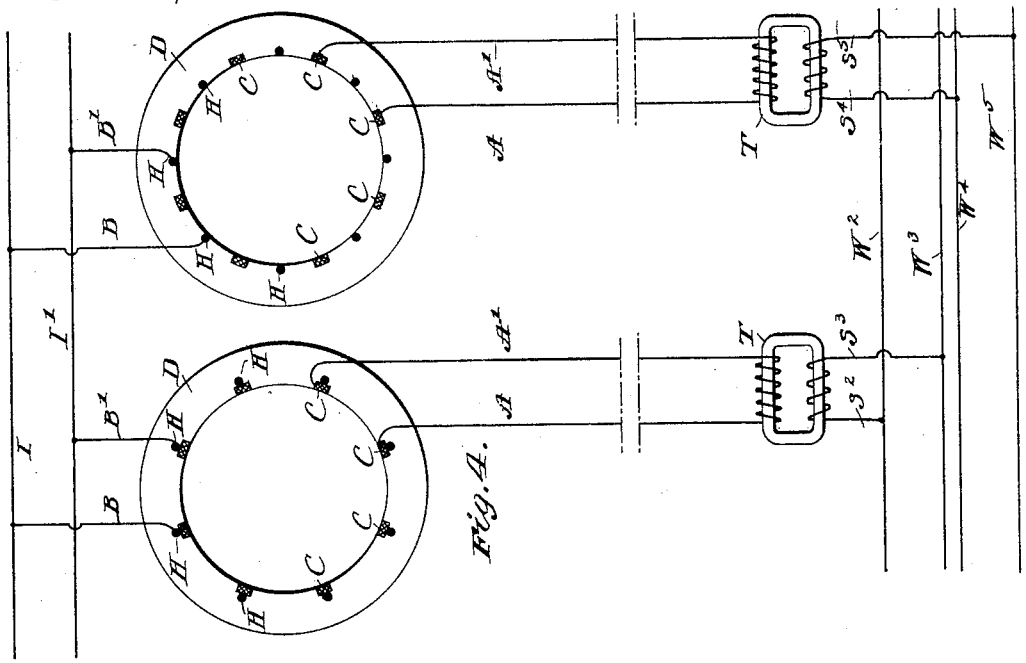
Figure 3:
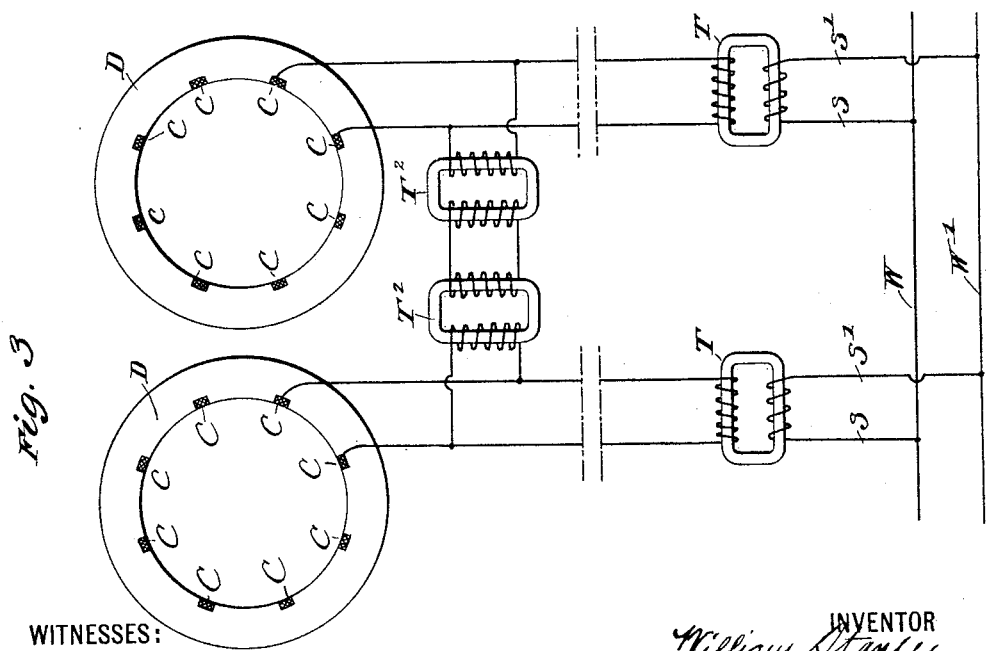

In the drawings Figure 1 represents diagrammatically my system. Fig. 2 represents in perspective one-half the armature of an alternator used in my system, showing the windings. Figs. 3 and 4 represent modifications of my system.

In working alternators in parallel in the ordinary manner, one of the principal difficulties is that when the mains are in parallel a defect arising in any wire of one main, such as a ground or a leak, affects all the wires in the circuit so that if at any other point another ground or leak occurs the alternators between the two grounded points are all short circuited. I overcome this difficulty by keeping the mains from the different machines independent and by supplying transformers whose secondaries I connect in parallel with the working circuit. When the alternators are so connected with the working circuit through transformers, it will be seen that there can be no ground or leakage of the current on the mains, except from one wire to the other of the same alternator, so that, unless the main of one alternator has two weak points, there is no leakage, and, at any rate, the leakage due to two weak points can affect directly only one alternator. When the secondaries of the transformers are in parallel, it is, of course, necessary that the alternators be in phase. In order to effect this simply and surely, I apply to the armature of each alternator a winding, separate and distinct from the winding supplying the working circuit. This I call a synchronizing winding. This winding is of low inductance and low resistance and is uniform on all the alternators. The synchronizing windings on all the alternators are then joined in parallel.

It will be seen that independently of the working circuit the alternators are kept in a definite phase relation by these windings, and that any correction current, which may pass from one alternator to another in order to maintain them in phase, will not cause any fluctuation on the working circuits. The synchronizing windings have in addition the function of maintaining a load upon the several alternators, whatever may be the condition of the mains supplying the working circuit, so that if the main of one alternator or the windings on the armature connected to the main break and the alternator thereby becomes unloaded, so far as that circuit is concerned, it is still kept in phase with the alternators with which it is connected by the synchronous winding and so prevented from racing which is liable to injure the alternator and the motive power driving it.

I will explain my invention as applied to alternators of the type shown in the patent to Stanley and Kelly, No. 499,446, dated June 13, 1893.

In Fig. 1, D D' are the armatures of two such alternators, in which the coils are stationary. Within the armatures are revolving inductors energized by the surrounding energizing coil. From the windings C C the working mains A A' are supplied. These are the high potential mains. The mains supply step-down transformers T T, the secondaries of which S S' are connected in parallel with the working circuit W W'. In such a case it will be seen that there can be no leakage from the high potential main of one machine to the high potential circuit of any other. To be any ground or leakage there must be two weak spots in the same main and even in that case only one alternator is affected by such defects. To keep the alternators in phase, I use synchronizing windings. The windings H H, &c., are the synchronizing windings and, as shown, are placed in grooves in the armature half way between the windings supplying the high potential mains. These windings are of very low resistance and induction. Their terminals B B' are connected to the conductors I I' so that the coils are in parallel, as shown. The result is that the sychronizing windings will maintain the alternators in phase independently of the mains supplying the energy for the working circuit, and, that too, even if the main of any one machine breaks.

Fig. 2 shows the two sets of coils on an armature in perspective. The coils C C supplying energy for the working circuit are of the number of turns according to the use for which the machine is designed. The synchronizing windings H H are shown as a large conductor having but half a turn in each coil.

The currents of the high potential mains of the alternators may be kept in phase, although the mains are kept distinct, without the use of an independent synchronizing circuit on the armature, and I do not wish to be understood as saying otherwise. This can be accomplished, as shown in Fig. 3, by the use of separate transformers $T^2$ $T^2$ whose primaries are connected to the high potential mains and whose secondaries are connected together in parallel to a circuit which has no other function than to keep the alternators in phase. These synchronizing transformers are placed near to the alternators so that the correction current affects but a small part of the circuit traversed by the current supplying energy to the working circuit. In this way the electrical independence of the mains of the several alternators is preserved. The synchronizing winding on the armature is, however, preferred and may be used to advantage, even in systems where the mains are connected directly to the working circuits, in parallel, in which case the alternators are kept in phase without affecting the currents passing over the working circuit.

If it is desired to supply independent working circuits with currents of different phase, the synchronizing windings on one armature may be displaced with reference to the working coils on that armature, so as to make the necessary difference in phase in the two sets of working coils when the motors are running synchronously with respect to the currents in the synchronizing coils. Such a modification is shown in Fig. 4, in which, when the alternators are in synchronism with respect to the synchronizing windings, H, H, the currents induced in the armature windings C, C, of one machine are displaced in phase ninety degrees with reference to those induced in the armature windings C, C, of the other machine. The secondaries $S^2$, $S^3$, and $S^4$, $S^5$ of the transformers T, T, are connected to the working circuits $W^2$, $W^3$, and $W^4$, $W^5$ respectively, so that the working circuits are supplied by several alternators with currents having a definite difference of phase.

It is evident that my invention is applicable to systems of distribution containing alternators of other types than those in which the armatures and coils are stationary, and I therefore do not limit myself to a system containing any particular type of alternator.

Having thus described my invention, I claim—

1. In a system of electrical distribution the combination of several alternators having synchronizing coils upon their armatures separate and distinct from the coils supplying energy to the line wires, said synchronizing coils being connected in parallel, substantially as described.

2. In a system of electrical distribution the combination of several alternators having means for maintaining the same in phase, with separate transformers for each alternator, the secondaries of said transformers being connected in parallel to the working circuit, substantially as described.

3. In a system of electrical distribution the combination of several alternators each having an armature coil supplying the current for the working circuit, and independent armature coils connected together in parallel, with separate transformers for each alternator having their secondaries connected in parallel to the working circuit of the system, substantially as described.

4. The method of distributing electrical energy from several alternators which consists in running the alternators so as to generate currents of like phase, transforming the separate currents into currents of a different potential, and combining such transformed currents so as to produce in the working circuit a combined current of a potential like to that of the transformed currents, substantially as described.

In witness whereof I have hereunto set my hand this 26th day of October, 1894.

WILLIAM STANLEY.

Witnesses:
JOHN F. KELLY,
A. C. CLARK.